United States Patent Office 3,560,573
Patented Feb. 2, 1971

3,560,573
PROCESS FOR THE PRODUCTION OF PENTACHLOROTHIOPHENOL
Manfred Blazejak, Dusseldorf, and Josef Haydn, Leverkusen, Germany, assignors to Farbenfabriken Bayer Aktiengesellschaft, Leverkusen, Germany, a corporation of Germany
No Drawing. Filed June 25, 1968, Ser. No. 739,660
Claims priority, application Germany, July 1, 1967, F 52,839
Int. Cl. C07c *149/34*
U.S. Cl. 260—609                                          4 Claims

ABSTRACT OF THE DISCLOSURE

Pentachlorothiophenol produced from hexachlorobenzene, sodium sulphide and sulphur in a lower aliphatic alcohol reaction medium is recovered from aqueous solution by the addition of an ammonium salt and a wetting agent.

---

This invention relates to a process for the production of pentachlorothiophenol.

Pentachlorothiophenol is used as a masticating agent in the rubber industry. It is known that pentachlorothiophenol can be produced in a lower aliphatic alcohol reaction medium. Upon dissolving the resulting sodium salt of pentachlorothiophenol in aqueous solution, the water insoluble pentachlorothiophenol may be precipitated therefrom by the addition of a dilute mineral acid. The disadvantage of this process is that when pentachlorothiophenol is precipitated by acid addition to the aqueous solution which also contains sodium polysulphide, sulphur is precipitated, i.e., pentachlorothiophenol contaminated by free sulphur is obtained. In addition, the disulphide of pentachlorothiophenol is formed in a substantial quantity. Unfortunately, the slightest trace of free sulphur considerably inhibits the masticating effect of pentachlorothiophenol. Accordingly, the conventional procedure of precipitation by acid addition necessitates time consuming recrystallization in order to obtain pure pentachlorothiophenol.

The foregoing difficulty can be avoided if precipitation is carried out by the introduction of gaseous sulphur dioxide. In this case, precipitated sulphur forms, in conjunction with the sulphurous acid producted, intermediate water-soluble thio acids which can be washed out of the pentachlorothiophenol. However, if this product is subsequently transferred to a suction filter in order to remove the mother liquor and to wash it substantially free of salt, the pentachlorothiophenol hardens under the suction effect to a solid, concrete-like block which is impermeable to water and extremely difficult to wash. The filter cake has to be loosened up mechanically before each washing step and this can damage the bottom of the filter. Moreover, uniformity of particulated filter cake is difficult to achieve with the net result that considerable time is required to obtain a uniformly pure product.

We have now found that the above-mentioned disadvantages can be obviated in the production of pentachlorothiophenol from hexachlorobenzene, sodium sulphide and sulphur in lower aliphatic alcohols, i.e., lower alkanols containing up to four carbon atoms, provided the pentachlorothiophenol formed is precipitated with ammonium salts of inorganic or organic acids in the presence of a wetting agent. The process may be carried out, for example, by adding an ammonium salt such as ammonium chloride and a small quantity of wetting agent such as an alkylsulphonate to the hot aqueous solution containing the sodium pentachlorothiophenol and stirring until precipitation is complete. The reaction mixture may be transferred to a suction filter in order to separate the pentachlorothiophenol from the mother liquor. A pure pentachlorothiophenol is obtained as the residue after washing one or more times with hot water.

It is surprising that, in this process, the pentachlorothiophenol is precipitated in the form of fine, loose crystals which can be readily filtered at a rapid rate on a suction filter and then washed out. The product is not contaminated with free sulphur and the volume/time yield is tripled in comparison with the sulphur dioxide process.

Precipitation is preferably carried out at a temperature of from 30–100° C. The ammonium salt is generally used in quantities of from 1.05–1.5 equivalents, based on each equivalent of hexachlorobenzene used. It is of course possible to use larger quantities of the ammonium salt, although it is not economical to do so.

In an alternative embodiment of the process of the present invention, precipitation is initiated with 0.1–0.5 equivalent of ammonium salt per equivalent of hexachlorobenzene and is completed by the introduction of sulphur dioxide.

The salts of strong mineral acids such as, for example, $NH_4Cl$, $(NH_4)_2SO_4$, $NH_4HSO_4$ and $(NH_4)_2HPO_4$ are particularly useful in the present invention although salts of weaker inorganic acids may also be employed. Additionally, ammonium compounds of organic acids, preferably lower alkanoic acids such as, for example, $CH_3COONH_4$, or mixtures thereof may be employed. A combination of an inorganic ammonium salt with an organic acid such as, for example, $NH_4Cl+CH_3COOH$, may also be used.

Although the presence of a wetting agent is critical to the present process, the identity thereof is not. Alkylsulphonates of the formula: R—$SO_3Na$, in which R represents a hydrocarbon radical with an average chain length of 15 carbon atoms are among the many readily available and commonly used wetting agents. The wetting agent is generally used in a quantity of, for example, 0.01–0.1% by weight, based on the hexachlorobenzene used.

The process according to the invention is illustrated by the following examples wherein said alkylsulphonate is as described above.

EXAMPLE 1

750 parts by weight of hexachlorobenzene, 700 parts by weight of sodium sulphide, 150 parts by weight of sulphur and 2900 parts by weight of methanol are introduced into a 5-litre-capacity autoclave equipped with a stirring mechanism. The autoclave is closed and the reaction mixture is heated for 8 hours to 108° C. Following depressurization, the methanol is distilled off and the residue is taken up in hot water. Following the addition of common salt, the crude sodium pentachlorothiophenol precipitated. It is filtered off from the mother liquor and redissolved in 2500 parts by weight of hot water. 220 parts by weight of ammonium sulphate and 0.05 part by weight of alkyl sulphonate are then added and the resulting mixture is stirred for 6 hours at 90–95° C. The reaction mixture is then transferred to a suction filter box, and the precipitated pentachlorothiophenol is suction filtered. The product is then washed free of salt with hot water. Analysis of the dried pentachlorothiophenol gave the following values. (Percent): C, 25.43; Cl, 62.35; S, 11.0. Th. (percent): C, 25.52; Cl, 62.75; S, 11.36.

Example 2

An aqueous solution of crude sodium pentachlorothiophenolate was prepared as described in Example 1. For precipitation, 0.06 part by weight of alkyl sulphonate and 150 parts by weight of ammonium chloride were added, and the mixture was stirred for 2 hours at 80–100° C.

The pentachlorothiophenol was then filtered off on a suction filter and washed free of salt with hot water. It was found to contain 11.2% of sulphur.

EXAMPLE 3

An aqueous solution of crude sodium pentachlorothiophenolate was prepared as described in Example 1. 0.04 part by weight of alkyl sulphonate and 100 parts by weight of ammonium sulphate were then added. Sulphur dioxide was then introduced into the reaction mixture with stirring over a period of 4 hours at 80–100° C. until pentachlorothiophenol is quantitatively precipated thereafter it is suction-filtered and washed free of salt with hot water. It was found to contain 11.05% of sulphur.

The following table provides a comparison of the volume/time yield resulting from the working-up of the same reaction mixture. Sample A was precipitated with sulphur dioxide only and Sample B was precipitated in accordance with Example 3.

| Filtration of the mother liquor [1] | Loosening up of the filter cake, minutes | 1st wash, hours | Loosening up of the filter cake, minutes | 2nd wash, hours | Loosening up of the filter cake, minutes | 3rd wash, hours | Total time, hours |
|---|---|---|---|---|---|---|---|
| Sample A-8 | 30 | 5 | 30 | 4 | 30 | 4 | 22½ |
| Sample B-2 hours | | 1½ | | 1½ | | 1½ | 6½ |

[1] Under suction.

EXAMPLE 4

An aqueous solution of crude sodium pentachlorothiophenolate was prepared as described in Example 1 and 280 parts by weight of ammonium acetate and 0.02 part by weight of alkyl sulphonate were added. The mixture was then stirred for 4 hours at 100° C. The pentachlorothiophenol precipitated was then removed from the mother liquor on a suction filter and washed free of salt with hot water. It was found to contain 10.9% of sulphur.

EXAMPLE 5

An aqueous solution of crude sodium pentachlorothiophenolate was prepared as described in Example 1. 0.1 part by weight of alkyl sulphonate and 200 parts by weight of ammonium phosphate were then added, followed by 4 hours' stirring at 100° C. The pentachlorothiophenol precipitated was separated off in a centrifuge and washed free of salt with water. It was found to contain 11.1% S.

EXAMPLE 6

An aqueous crude sodium pentachlorothiophenolate solution was prepared as described in Example 1. 0.06 part by weight of alkyl sulphonate and 100 parts by weight of ammonium chloride together with 120 parts by weight of acetic acid were then added, followed by 5 hours' stirring at 80° C. The pentachlorothiophenol precipitated was separated in a centrifuge and washed out with hot water. It was found to contain 11.2% S.

What is claimed is:

1. In the process for producing pentachlorothiophenol by reacting hexachlorobenzene, sodium sulphide and sulphur in a lower aliphatic alcohol reaction medium and recovering pentachlorothiophenol from an aqueous solution of the resulting reaction product, the improvement which comprises precipitating pentachlorothiophenol by the addition of an ammonium salt of hydrochloric acid, sulphuric acid, phosphoric acid or a lower alkanoic acid at a temperature of from 30–100° C. and in the presence of from 0.01 to about 0.1% by weight of alkyl sulphonate based on the weight of said hexachlorobenzene.

2. The process of claim 1 wherein precipitation is effected by the addition of from about 1.05 to 1.5 equivalents of said ammonium salt per equivalent of hexachlorobenzene reactant.

3. The process of claim 1 wherein precipitation is effected by the addition of from about 0.1 to about 0.5 equivalents of said ammonium salt per equivalent of hexachlorobenzene reactant followed by the introduction of sulphur dioxide into said aqueous solution.

4. The process of claim 1 wherein the precipitated pentachlorothiophenol is free from mother liquor and water washed.

References Cited
FOREIGN PATENTS
553,518  2/1958  Canada _____ 260—609

CHARLES B. PARKER, Primary Examiner

D. R. PHILLIPS, Assistant Examiner